(12) United States Patent
Ji et al.

(10) Patent No.: US 11,134,188 B2
(45) Date of Patent: Sep. 28, 2021

(54) ELECTRONIC DEVICE WITH IMAGE CAPTURING DEVICE THAT RECORDS BASED ON EXTERNAL INPUTS

(71) Applicant: MOTOROLA MOBILITY LLC, Chicago, IL (US)

(72) Inventors: Zhengping Ji, Hinsdale, IL (US); Olivier D. Meirhaeghe, Lincolnshire, IL (US); Rachid Alameh, Crystal Lake, IL (US); Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/544,856

(22) Filed: Aug. 19, 2019

(65) Prior Publication Data

US 2021/0058549 A1 Feb. 25, 2021

(51) Int. Cl.
H04N 5/232 (2006.01)
G10L 17/00 (2013.01)

(52) U.S. Cl.
CPC ......... *H04N 5/23219* (2013.01); *G10L 17/00* (2013.01); *H04N 5/23222* (2013.01)

(58) Field of Classification Search
None
See application file for complete search history.

(56) References Cited

U.S. PATENT DOCUMENTS

| | | | |
|---|---|---|---|
| 10,104,280 B2* | 10/2018 | Butts | G10L 15/22 |
| 2002/0080132 A1* | 6/2002 | Dai | G06F 1/3265 345/212 |
| 2007/0086764 A1* | 4/2007 | Konicek | G03B 31/06 396/56 |
| 2011/0205379 A1* | 8/2011 | Konicek | H04N 5/2251 348/211.1 |
| 2012/0265538 A1* | 10/2012 | Gustafsson | H04N 5/23203 704/275 |
| 2013/0124207 A1* | 5/2013 | Sarin | H04N 5/232 704/275 |
| 2014/0247368 A1* | 9/2014 | Chinn | H04N 1/00403 348/207.1 |
| 2016/0307573 A1* | 10/2016 | Wobrock | H04N 5/232 |
| 2017/0041523 A1* | 2/2017 | Rifkin | H04N 5/23203 |

\* cited by examiner

*Primary Examiner* — James M Hannett
(74) *Attorney, Agent, or Firm* — Isidore PLLC (57) ABSTRACT

An electronic device, method, and computer program product provide detecting entry of an image capturing device of the electronic device into an image capture mode. In response to detecting entry, a controller of the electronic device detects, via at least one of: (i) the image capturing device; and (ii) the microphone, a first external input that alerts a subject that an image of the subject is about to be captured by the image capturing device. In response to detecting the first external input, the controller enables the electronic device to monitor for detection by one of: (i) the image capturing device; and (ii) the microphone of a second external input. The second external input is associated with the subject being ready to have an image of the subject captured. In response to detecting the second external input, the controller activates recording of image data via the image capturing device.

20 Claims, 10 Drawing Sheets

ELECTRONIC DEVICE WITH IMAGE CAPTURING DEVICE THAT RECORDS BASED ON EXTERNAL INPUTS

1. TECHNICAL FIELD

The present disclosure relates generally to image capturing electronic devices, and in particular to recording controls of image capturing electronic devices.

2. DESCRIPTION OF THE RELATED ART

User controls for image capturing devices have long relied upon manual triggering to capture an image. Some conventional image capturing devices include a manually triggered delay option to allow the user of the image capturing device to be included in the captured image. While the fixed delay provides time for the user to move into the field of view of the image capturing device, the fixed delay does not necessarily enable capture of a picture of the subjects posed/ready for the image capture.

Recently, mobile electronic devices, such as mobile phones and tablets, with image capturing devices have become ubiquitous. Users rely on the mobile electronic devices to capture image data, both still shots and video. Additional control features have been incorporated in some electronic devices to assist in obtaining images with the subjects properly posed. For example, voice command functionality is being introduced that enables the user to vocally/verbally actuate image/video capture and avoid inadvertent movement of the mobile electronic device that would otherwise occur when manually actuating the image capturing device. However, capturing an image of a properly posed subject may need to occur in a very short time span, such that even a voice command may not be quick enough in some instances. In addition, in some instances, the voice command itself is not desired as the voiced command would add audio to captured video or prevent the user from being posed in a "selfie" image. In addition, some social situations are inappropriate for voice commands.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

According to aspects of the present innovation, an electronic device, a method and a computer program product enable an image capturing device of the electronic device to record images based on contextual cues. The image capturing device captures the images(s) based on the contextual cues, without requiring a manual input. In one or more embodiments, the electronic device includes a microphone that senses audio. A memory of the electronic device contains an image capture activation detection (ICAD) module. A controller of the electronic device is communicatively coupled to the image capturing device, the microphone, and the memory. The controller executes the ICAD module to enable the electronic device to provide the functionality of recording images based on contextual cue(s). The functionality includes, in response to detecting entry of the image capturing device into an image capture mode, detecting, via at least one of (i) the image capturing device and (ii) the microphone, a first external input. The first external input is intended to alert a subject that an image of the subject is about to be captured by the image capturing device. The functionality includes, in response to detecting the first external input, monitoring for detection by one of (i) the image capturing device and (ii) the microphone of a second external input. The second external input is associated with the subject being ready to have an image of the subject captured. The functionality includes, in response to detecting the second external input, activating recording of image data via the image capturing device.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. Embodiments incorporating teachings of the present disclosure are shown and described with respect to the figures presented herein.

Figure 1:
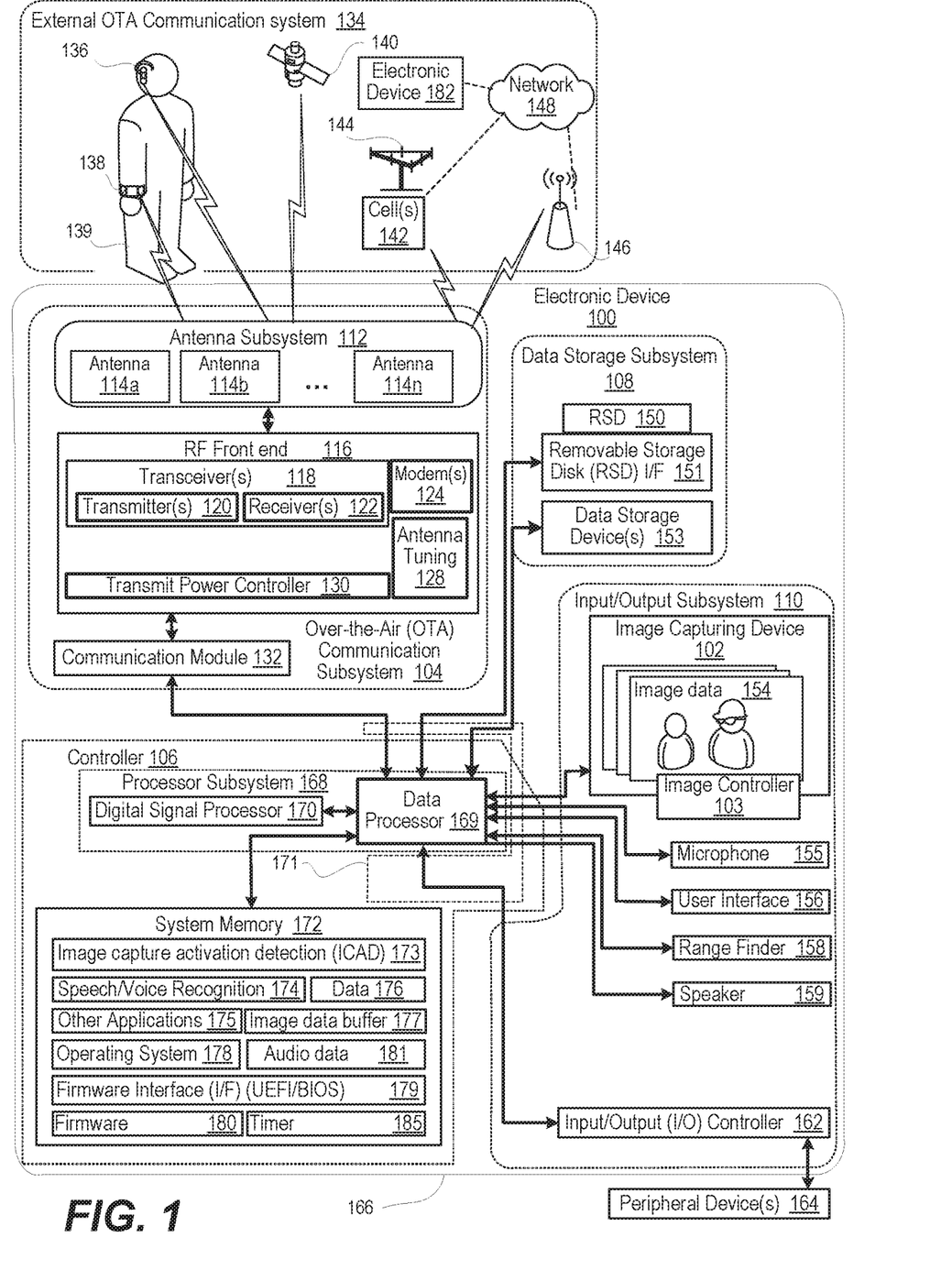
FIG. 1 is a functional block diagram of an electronic device having an image capturing device, according to one or more embodiments.

FIG. 1 is a functional block diagram illustrating example electronic device 100 having image capturing device 102 having imaging controller 103 that performs imaging tasks. Electronic device 100 can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless communication functionality. As a device supporting wireless communication, electronic device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem. These various devices all provide and/or include the necessary hardware and software to support the various wireless or wired communication functions as part of a communication system. Electronic device 100 can be intended to be portable, hand-held, wearable, detachable, positioned in a fixed location, or mounted to a movable vehicle. Electronic device 100 can have computing functionality directed to local functionality without wide area communication capabilities.

Referring now to the specific component makeup and the associated functionality of the presented components. In one or more embodiments, electronic device 100 includes over-the-air (OTA) communication subsystem 104, controller 106, data storage subsystem 108, and input/output subsystem 110. OTA communication subsystem 104 includes antenna subsystem 112 having antenna elements 114a-114n. OTA communication subsystem 104 includes radio frequency (RF) front end 116 having transceiver(s) 118 that includes transmitter(s) 120 and receiver(s) 122. RF front end 116 further includes modem(s) 124, proximity (capacitance) detection component 126, antenna tuning circuitry 128, and transmit power controller 130. OTA communication subsystem 104 includes communication module 132. OTA communication subsystem 104 communicates with external OTA communication system 134. External OTA communication system 134 can include devices such as wireless headset 136 and smart watch 138 that are respectively worn by person 139. External communication system 134 can include global positioning system (GPS) satellites 140, cell(s) 142 of radio access networks (RANs) 144, node 146, and networks 148.

Data storage subsystem 108 of electronic device 100 includes removable storage device (RSD) 150, RSD interface (I/F) 151, and data storage device(s) 153. I/O subsystem 110 includes image capturing device 102 that captures stream image data 154. I/O subsystem 110 includes microphone 155, user interface device 156, range finder 158, audio speaker 159, and I/O controller 162 that connects to peripheral devices 164 external to housing 166 of electronic device 100.

Controller 106 includes processor subsystem 168 that includes one or more central processing units (CPUs) ("data processor") 169 that is communicatively coupled, via system interlink 171, to system memory 172. System memory 172 includes applications such as image capture activation detection (ICAD) application 173, speech/voice recognition application 174, and other application(s) 175. System memory 172 includes data 176 used by applications 173-175. System memory 172 includes image data buffer 177 used by ICAD application 173. System memory 172 further includes operating system 178, firmware interface (I/F) 179, such as basic input/output system (BIOS) or Uniform Extensible Firmware Interface (UEFI), and other firmware 180. Processor subsystem 168 of controller 106 executes program code to provide functionality of electronic device 100. These software and/or firmware modules have varying functionality when their corresponding program code is executed by processor subsystem 168 or secondary processing devices within electronic device 100. Processor subsystem 168 of controller 106 can execute program code of speech/voice recognition application 174 that accesses audio data 181 that is used to recognize spoken key words and phrases or recognizing a voice pattern of particular persons. Processor subsystem 168 of controller 106 can execute a timer 185 maintained in memory 172 for ICAD application 173.

In one or more embodiments, controller 106 of electronic device 100 is communicatively coupled via system interlink 171 to OTA communication subsystem 104, data storage subsystem 108, and input/output subsystem 110. Interlink 171 represents internal components that facilitate internal communicate by way of one or more shared or dedicated internal communication links, such as internal serial or parallel buses. Controller 106 controls image capturing device 102 and other functions and/or operations of electronic device 100. These functions and/or operations include, but are not limited to including, application data processing, communication with other electronic devices 182, navigation tasks, and signal processing. Electronic device 100 may use hardware component equivalents for application data processing and signal processing. For example, electronic device 100 may use special purpose hardware, dedicated processors, general purpose computers, microprocessor-based computers, micro-controllers, optical computers, analog computers, dedicated processors and/or dedicated hard wired logic. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (interlink 171) are illustrated in FIG. 1, it is to be understood that more, fewer, or different interconnections may be present in other embodiments.

Communication module 132 of OTA communication subsystem 104 operates in baseband frequency range to encode data for transmission and decode received data, according to a communication protocol. Modem(s) 124 modulate baseband encoded data from communication module 132 onto a carrier signal to provide a transmit signal that is amplified by transmitter(s) 120. Modem(s) 124 demodulates the received signal from cell(s) 142 or node 146 detected by antenna subsystem 112. The received signal is amplified and filtered by receiver(s) 122, which demodulate received encoded data from a received carrier signal. Antenna tuning circuitry 128 adjusts antenna impedance of antenna subsystem 112. Antenna tuning circuitry 128 improves antenna efficiency at desired transmit or receive frequencies of transmitter(s) 120 and receiver(s) 122, respectively, within transceiver(s) 118. Antenna tuning circuitry 128 is electrically coupled to antenna subsystem 112 and compensates for any lossy dielectric effect of being proximate to person 139. In one or more embodiments, antenna subsystem 112 includes multiple antenna elements 114a-114n that are individually tuned to selected RF bands to support different RF communication bands and protocols. Antenna elements 114a-114n can be used in combination for multiple input multiple output (MIMO) operation for beam steering and spatial diversity.

In one or more embodiments, controller 106, via OTA communication subsystem 104, performs multiple types of OTA communication with external OTA communication system 134. OTA communication subsystem 104 can communicate via Bluetooth connection with one or more personal access network (PAN) devices, such as wireless headset 136 and smart watch 138. Communication via Bluetooth connection includes both transmission and reception via a Bluetooth transceiver device. In one or more embodiments, OTA communication subsystem 104 communicates with one or more locally-networked devices via a wireless local area network (WLAN) link provided by node 146. Node 146 is connected to wide area network 148, such as the Internet. In one or more embodiments, OTA communication subsystem 104 communicates with GPS satellites 140 to obtain geospatial location information. In one or more embodiments, OTA communication subsystem 104 communicates with RANs 144 having respective base stations (BSs) or cells 142. RANs 144 are a part of a wireless wide area network (WWAN) that is connected to wide area network 148.

Data storage subsystem 108 provides nonvolatile storage accessible by controller 106. For example, data storage subsystem 108 can provide a large selection of other applications 175 that can be loaded into system memory 172. In one or more embodiments, local data storage device(s) 153 includes hard disk drives (HDDs), optical disk drives, solid state drives (SSDs), etc. In one or more embodiments, removable storage device (RSD) 150 that is received in RSD interface 151 is a computer program product or computer readable storage device, which can be referred to as non-transitory. RSD 150 can be accessed by controller 106 to provision electronic device 100 with program code. When executed by controller 106, the program code provides the functionality described herein to electronic device 100.

I/O subsystem 110 includes external and embedded input and output devices. Microphone 155 receives user audible inputs. User interface device 156 provides display and touch controls. Range finder 158 emits a waveform of energy, such as acoustic, infrared, RF, etc., whose time of flight is used to measure distance to a reflecting object. Audio speaker 159 provides audio output, including audio playback and alerts. Image capturing device 102, such as a camera, can receive and/or capture gestures and other image data. In one or more embodiments, image capturing device 102 generates still images and video. In one or more embodiments, I/O controller 162 connects to one or more peripheral devices 164 that can include/provide additional I/O functionality. I/O controller 162 can also interface to a wired local access network (LAN) (not shown).

Figure 2:
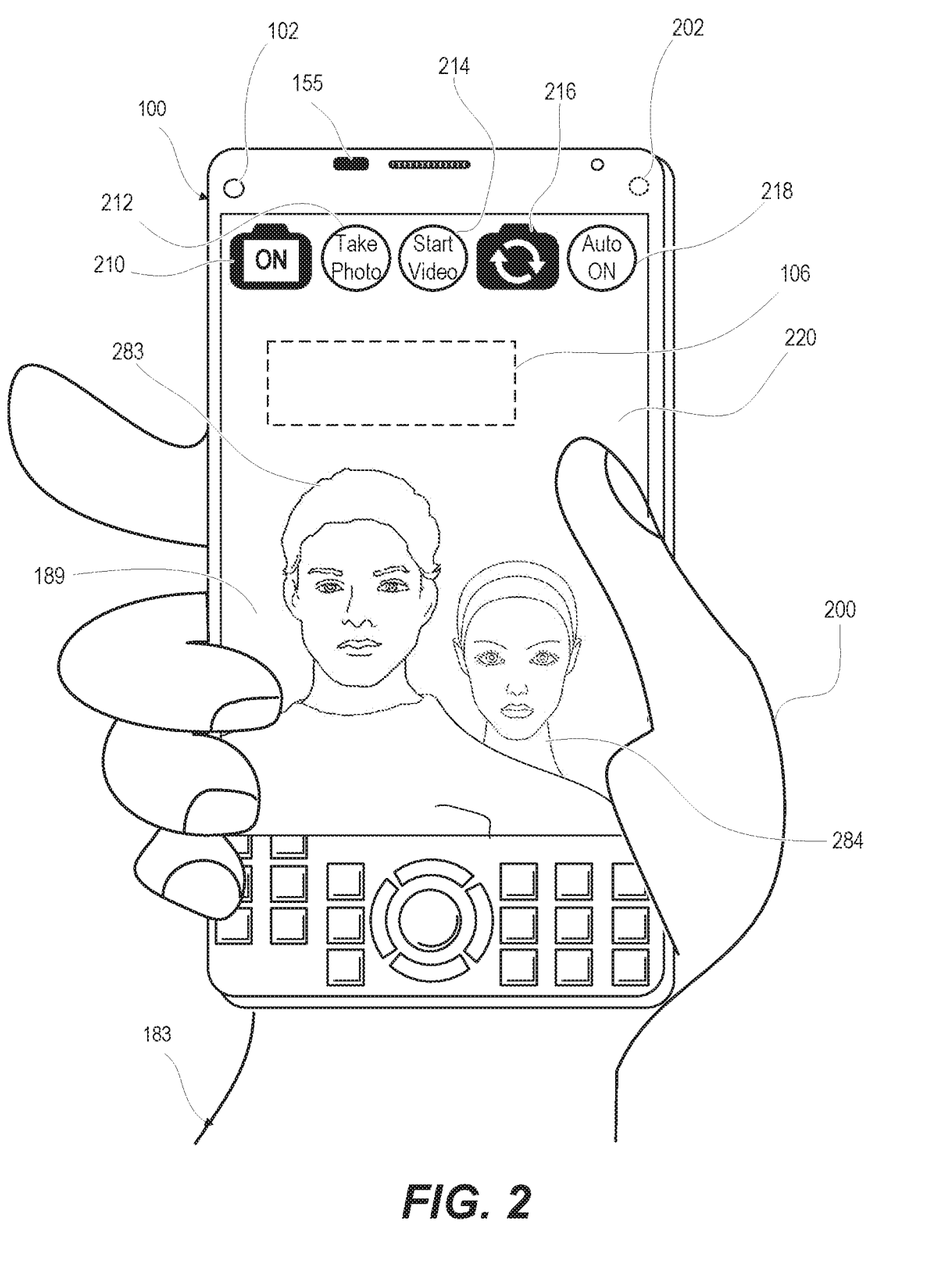
FIG. 2 is a front view of the electronic device with the image capturing device enabled and a preview image being presented on a user interface device, according to one or more embodiments.

FIG. 2 is a front view of electronic device 100 that includes user interface device 156. User interface device 156 presents controls for image capturing device 102 including image capturing mode button 210, manual photo button 212, manual video button 214, front/back camera button 216, and automatic record button 218. Image capturing mode button 210 receives a user input control by the user (first person 283) to put image capturing device 102 into image capturing mode. In one or more embodiments, microphone 155 receives a spoken command, which is recognized by controller 106 as triggering image capturing mode. With image capturing device 102 enabled, controller 106 presents, on user interface device 156, preview image 220 captured by image capturing device 102.

Manual photo button 212 can receive a user input control by the user (first person 283) to manually trigger image capturing device 102 to record an image. Manual video button 214 can receive a user input control by the user (first person 283) to manually trigger image capturing device 102 to record a video. Electronic device 100 can include both image capturing device 102 on a front side with user interface device 156 and second image capturing device 202 on a back side of electronic device 100. Front/back camera button 216 receives a user input control by the user (first person 283) to manually select one of the first and second image capturing devices 102, 202 as a source of preview image 220. Automatic record button 218 presents an indication of the status of an ability of controller 106 to automatically record an image or video based on context. Automatic record button 218 can also receive a user input control by the user (first person 283) to manually switch automatic record capability on and off.

In an illustrative scenario, controller 106 can automatically record an image in a "selfie" mode. Electronic device 100 is being held in hand 200 of the user (first person 283). Controller 106 can distinguish whether a user is also a subject based at least in part on selection of front or back imaging capturing device 102, 202. In one or more embodiments, controller 106 receives one or both of first and second external inputs via microphone 155. In one or more embodiments, controller 106 recognizes a use case of user (first person 283) being included in preview image 204. For example, controller 106 can determine that the user is included within a field of view of image capturing device 102 by recognizing at least one of: (i) a communication that is associated with recording selfie image data; (ii) an arm of the subject that extends toward the electronic device 100 within a field of view of image capturing device 102; and (iii) a face of the user (first person 283) as being the subject or one of multiple subjects. The user (first person 283) is the person that is currently using the electronic device 100. For example, the user (first person 283) can be the owner of electronic device 100. As another example, an owner of electronic device 100 may request that a third party take a picture of the owner. While controlling the electronic device 283, the third party becomes the user (first person 283) and the owner becomes the subject (second person 284). In one or more embodiments, the second external input can be based, at least in part, on detecting that a subject includes second person 284 who also has to indicate visually or orally being prepared for recording image data. In order to increases the likelihood that the second external input is in response to the first external input, controller 106 can require that a period of time tracked by timer 185 (FIG. 1) not be exceeded. Second person 284 is not necessarily an adult, but can be a child, an animal or animated machine, as discussed below with regard to FIG. 4.

Figure 3:
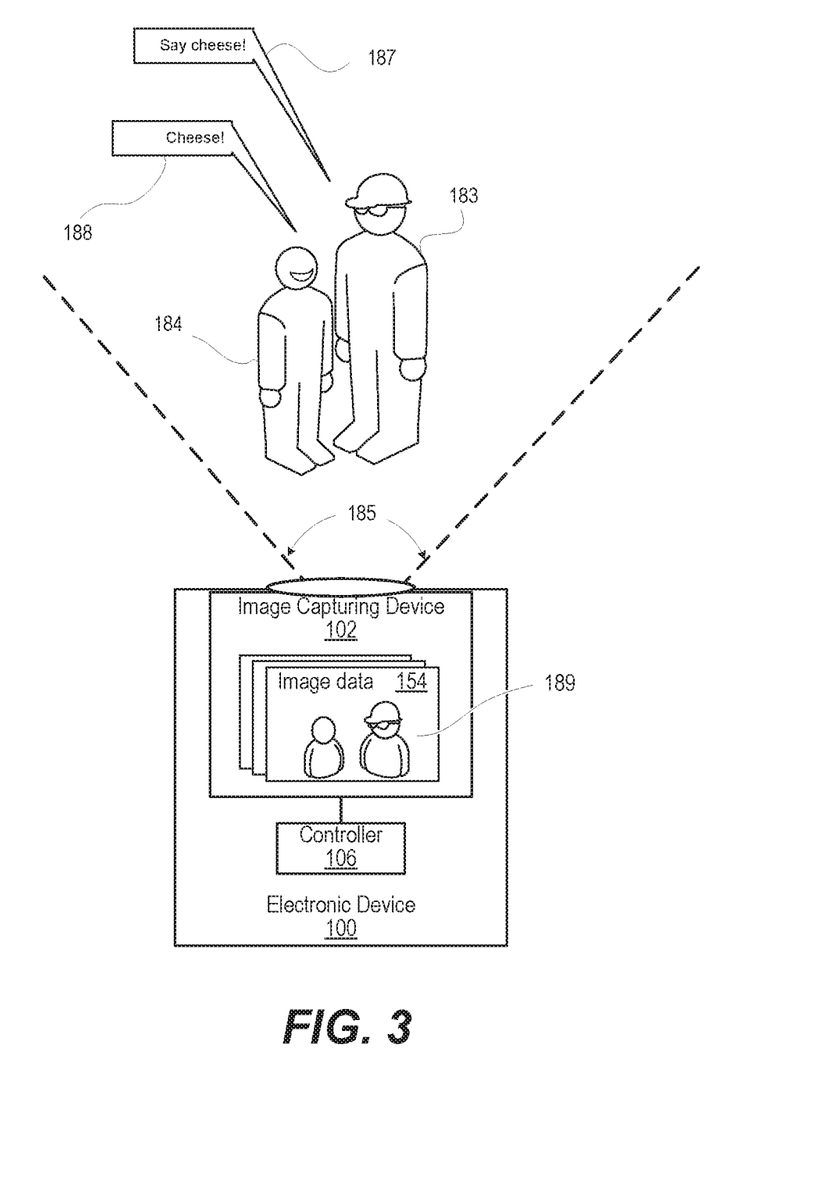
FIG. 3 is a diagram of the electronic device having a user and a subject in a field of view of the image capturing device, according to one or more embodiments.

FIG. 3 is a diagram of electronic device 100 having user (first person 283) and a subject (second person 284) in a field of view of image capturing device 102. Electronic device 100 in image capturing mode. In one or more embodiments, controller 106 facilitates capturing and recording of images by image capturing device 102 based on context. Within the presented description of the various embodiments, first person 283 is a user of electronic device 100. First person 283 chooses second person 284 as a subject for an image or video. In a first scenario, first and second persons 283, 284 are both within field of view (FOV) 385 of image capturing device 102. In other scenarios, first person 283 acts as both user of electronic device 100 and sole subject for a "selfie" captured by front image capturing device 102. In yet another scenario, first person 283 is not in FOV 385 when aiming image capturing device 102 at second person 284. Human context or cues are made by first and second persons 283, 284 who provide the context(s) as sequential first and second external inputs to electronic device 100. Controller 106 utilizes artificial intelligence (AI) to interpret humanly understood verbal and/or nonverbal communication by each of first and second persons 283, 284 as part of preparing to record an image of second person 284. Controller 106 detects an input that places image capturing device 102 into an image capture mode. In one or more embodiments, explicit or implicit consent by at least first person 283 is required before image data is captured. First person 283 interacts with electronic device 100 to provide a user input for electronic device 100 to enter into image capture mode. The user input can be an explicit manual or verbal user input.

In response to controller 106 detecting the input, controller places the image capturing device 102 into the image capture mode, and controller 106 monitors for and detects a first external input by a user (first person 283) that alerts the subject (person 284) that an image of the subject is about to be captured by image capturing device 102. In one or more embodiments, controller 106 detects the first external input via microphone 155. Detection can include analyzing, by speech/voice recognition application 174, captured audio for a spoken word based on audio data 181. For example, the phrase "say cheese" can be associated with a recognized first external input. Other examples of verbally presented first external input include counting "1, 2, 3", saying "look at me", and saying "picture". Detection can include analyzing, by speech/voice recognition application 174, for an identity of the source of the spoken word based on audio data 181. In one or more embodiments, controller 106 detects the first external input via the image capturing device 102, such as by recognizing a gesture or manner of holding the electronic device 100 by first person 283. For example, electronic device 100 being held in one of portrait and landscape mode with image capturing device 102 aimed steadily at a subject can be interpreted as the first external input. In one or more embodiments, image capturing device 102 or controller 106 include software-enabled image stabilization. Cropping of a larger digital image is performed to maintain elements within an image at the same relative location to remove the effects of movement of electronic device 100. In one or more embodiments, image capturing device 102 includes mechanically-based image stabilization (e.g., gimbal) to remove the effects of movement of electronic device 100. Movements in excess of certain thresholds that enable image stabilization can be used to determine whether or not the image capturing device 102 is being aimed steadily at the subject.

In response to detecting the first external input, controller 106 monitors for detection of a second external input by subject (e.g., second person 284). Second external input 188 by the subject is associated with the subject being ready to have an image of the subject captured. In one or more embodiments, controller 106 detects second external input via microphone 155. In one embodiment, detection can include analyzing, by speech/voice recognition application 174, for a specific spoken word and for the identity of the source of the spoken word, based on audio data 181. For example, the stand-alone word "cheese" can be determined to be a second external input.

Figure 4:
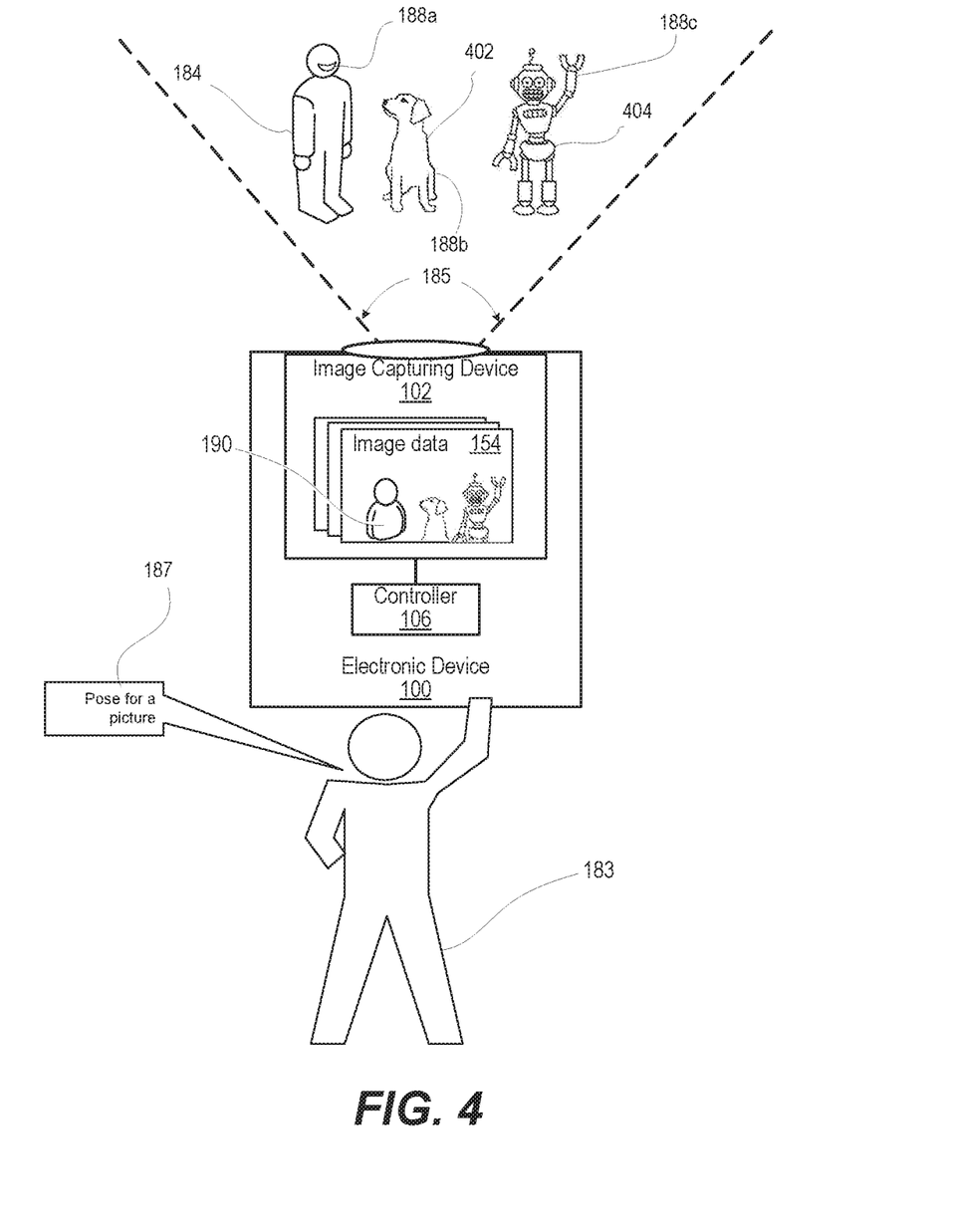
FIG. 4 is a diagram of the electronic device held by a user with several subjects in the field of view of the image capturing device, according to one or more embodiments.

In one or more embodiments, FIG. 4 depicts controller 106 detecting second external inputs 488a-488c via image capturing device 102, such as by recognizing a visual indication of a gesture, posture, smiling face, or orientation of the face of each subject presented in a preview 198 of image data 154. As a first example, second person 284 provides second external input 488a based on a smiling face.

While the embodiments are described and illustrated as involving a human second person as the subject, it is appreciated that in one or more embodiments the subject (284) can be (replaced by) a non-human entity, such as animal, 402 which can also provide a contextual clue in response to a first input from first person 283. For example, a (trained) dog can respond to a command to pose for a picture with a bark or other contextual response. For a second example, animal 402 provides second external input 488b based on a stationary pose. As a third example, robot 404 can be programmed to respond to the detection of a trigger spoken by the first user 283 by providing second external input 488c as a hand wave. In response to detecting second external inputs 488a-488c, controller 106 activates recording of image data 154 via the image capturing device 102. In one or more aspects, controller 106 enables electronic device 100 to be controlled by natural human communication between first and second persons 283, 284. Recording can occur within a short period of time, such as less than one second.

In one or more embodiments, second person 284 (subject) can be young or otherwise difficult to remain posed for any length of time for recording an image or video. Image data 154 can be buffered in image data buffer 177 as a burst mode to ensure capture of the precise moment in which second person 284 is properly posed. In one or more embodiments, controller 106 can automatically select the best image from the image data buffer 177 based on a correlated second external input 188.

Figure 5:
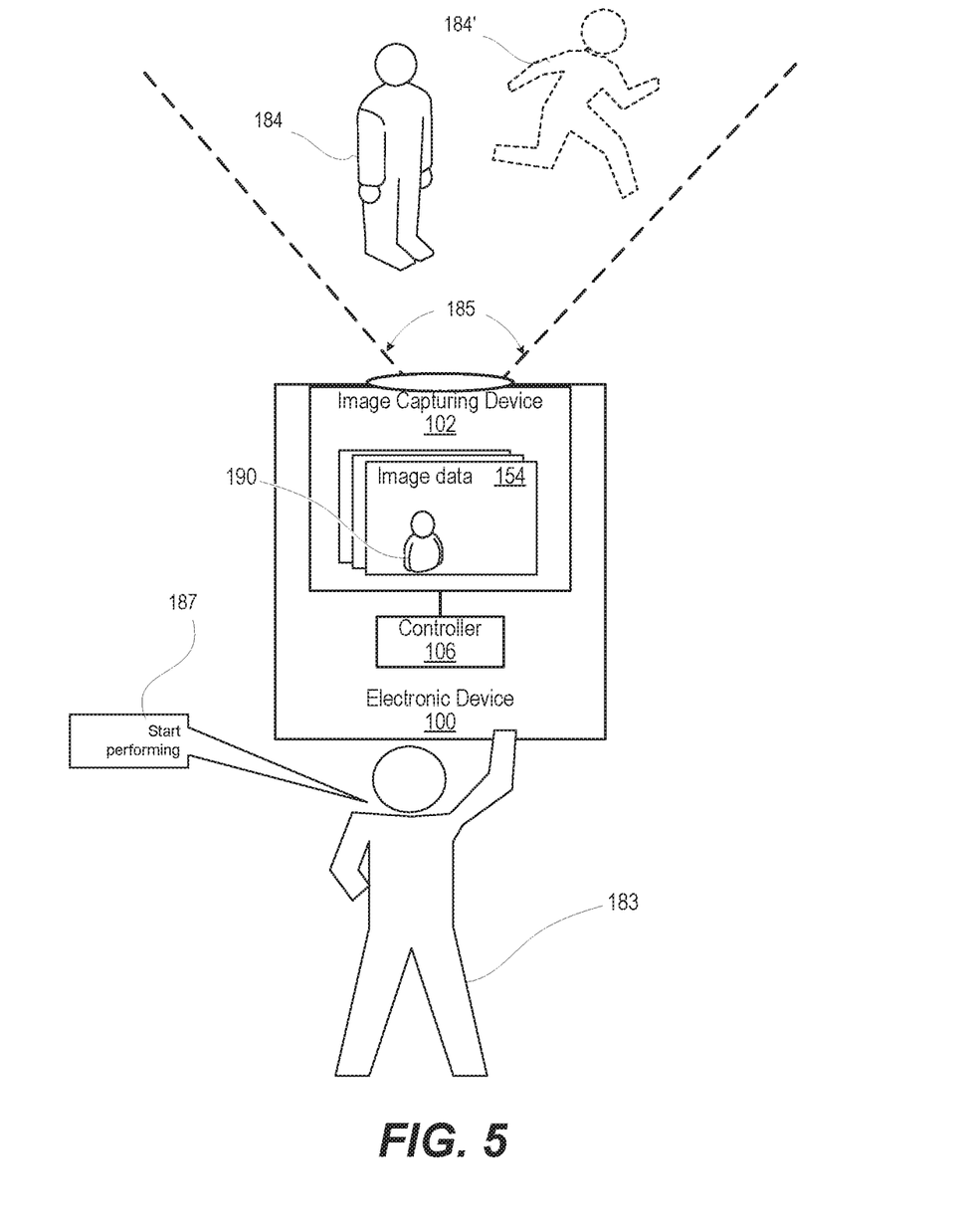
FIG. 5 is a diagram of the electronic device held by a user and with a subject in the field of view of the image capturing device, according to one or more embodiments.

FIG. 5 is a diagram of electronic device 100 held by a user (first person 283) with a subject (second person 284) in the field of view of image capturing device 102. Electronic device 100 is in video capture mode. In one or more embodiments, image data 154 is a video that is first buffered in image data buffer 177. Controller 106 selects when to start recording the video of image data 154 based on the correlated second external input 188. For example, the video can be intended to capture a prompted performance, such as a dance, playing of a musical instrument, singing, an athletic performance, etc. User (first person 283) may prefer to not include the moments of preparation in which first person 283 prompts subject (second person 284) to perform. In one example, second person 284 is initially in an inactive state as characterized by standing. Subsequently, second person 284' transitions to an active state of performing, such as by running. Having to manually start the video may inadvertently miss the beginning of the performance. Alternatively, manually starting the video too early results in inclusion of the undesired preparatory period. Conventionally, the video requires post-production editing to omit this preparatory portion. According to aspects of the present innovation, by starting a recording based on external cues, controller 106 avoids missing the start of the performance, but controller can also avoid storing the unwanted preparatory period as a part of the final video. By buffering the start of the video from the initial user prompt, controller 106 can then select the beginning of the recording, which omits the preparatory portions of the response by the subject before the start of the performance. Controller 106 then captures all of the performance. In one or more embodiments, the user manually terminates the recording. In one or more embodiments, controller 106 detects when the subject has concluded performance, such as a transition from active to inactive state, and terminates the recording.

In one or more embodiments, electronic device 100 ensures data privacy for user (first person 283) by only recording image data either expressly selected by the user or implicitly selected by the user. Controller 106 determines whether user has implicitly selected recording based on context, according to aspects of the present disclosure. Speech/vocal recognition application 174 can limit processing of the spoken word to a local processor that resides on electronic device 100. Personal privacy is made more secure by avoiding opportunities for interception.

Figure 6:
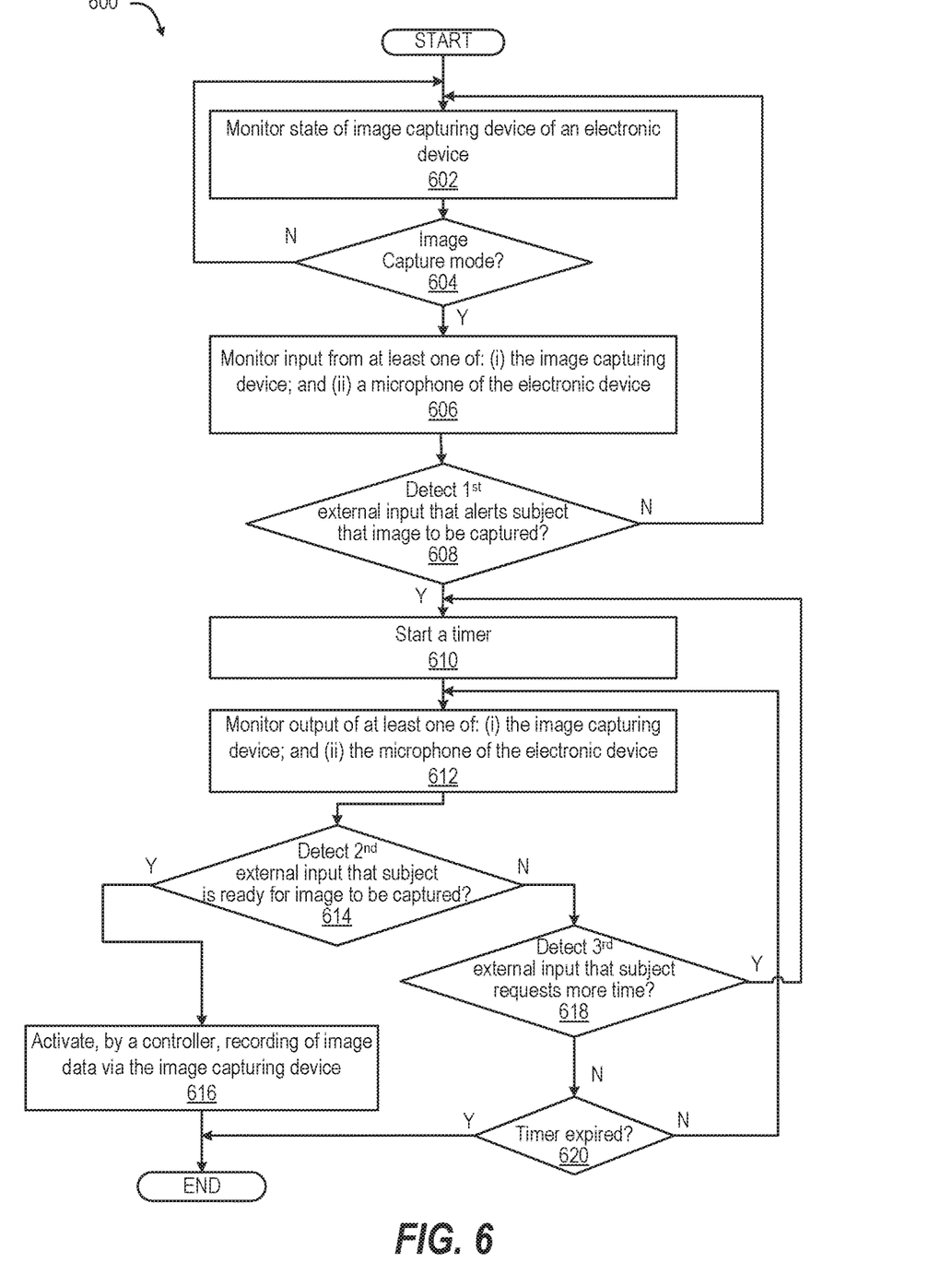
FIG. 6 is a flow diagram of a method for recording images via the image capturing device in response to detected verbal and/or nonverbal context presented by the user and the subject of an image capturing scenario, according to one or more embodiments.

FIG. 6 is a flow diagram of method 600 for recording images via image capturing device 102 (FIG. 1) in response to detected verbal and/or nonverbal context presented by the user (283) (FIG. 1)) and the subject (284) of an image capturing scenario. In one or more embodiments, method 600 is performed entirely by, or under the supervision by, controller 106 (FIG. 1). In one or more embodiments, certain functions can be delegated to image controller 103 of image capturing device 102 (FIG. 1). Method 600 includes monitoring, by controller 106 (FIG. 1), a state of image capturing device 102 (FIG. 1) (block 602). In decision block 604, controller 106 (FIG. 1) determines whether image capturing device has entered into image capture mode. In response to determining that image capturing device has not entered into image capture mode, method 600 returns to block 602. In response to determining that image capturing device has entered into image capture mode, method 600 includes monitoring input of at least one of (i) image capturing device 102 (FIG. 1) and (ii) microphone 155 (FIG. 1) of electronic device 100 (FIG. 1) (block 606). A determination is made, at decision block 608, by controller 106, whether a first external input by a user is detected that alerts a subject that an image is to be captured. In response to determining that the first external input is not detected, method 600 returns to block 602.

In response to determining that the first external input is detected, controller 106 (FIG. 1) starts a timer (block 610). For example, a timer of 20-30 seconds can be started. The timer sets a maximum time, not a minimum time, that can occur between the first external input and a response by a subject. Method 600 includes monitoring input of at least one of: (i) the image capturing device; and (ii) the microphone of the electronic device (block 612). A determination is made by controller 106 (FIG. 1), at decision block 614, whether a second external input is detected that indicates that the subject is ready for an image to be captured. In response to determining that the second external input is detected, method 600 includes activating, by the controller, recording of image data via the image capturing device (block 616). Then method 600 ends.

In response to determining that the second external input is not detected, method 600 includes determining, in decision block 618, whether a third external input is detected that indicates that the subject requests more time to prepare for recording of the image. The timer is used so that a strong inference can be made by controller 106 (FIG. 1) that what is deemed a second external input is made in response to the first external input. In order to allow for instances in which more time is needed, in one or more embodiments, the controller 106 (FIG. 1) detects and responds to further interactions between user and subject such as asking for more time. For example, a subject may be combing their hair or doing other preparatory steps that take more time than merely posing. In response to determining that the third external input is detected, method 600 returns to block 610. In response to determining that the third external input is not detected, a determination is made in decision block 620 whether the timer has expired. In response to determining that the timer has not expired, method 600 returns to block 612. In response to determining that the timer has expired, method 600 ends.

The two-party communication provides a "triggerless" method of activating the recording of image data while preserving personal privacy of the parties. The method is referred to as "triggerless" in that the user and the subject do not provide a command input solely for the electronic device 100 (FIG. 1) as a trigger. Instead, electronic device 100 utilizes contextual information that is primarily intended as human communication. Communications by the parties that can provide these triggerless image capture operations are not monitored in the background unless the electronic device is placed into an image capturing mode. In one or more embodiments, these communications are not transmitted to the network for interpretation from a human form of communication (i.e., spoken word, gesture) to a machine-readable form of communication. Rigidly defined voice commands are not required, simplifying training of a user to use the image capturing device. In one or more embodiments, controller 106 determines context by one or more of: (i) assessing scene imaged/presented in preview by image capturing device; (ii) confirming people are next to each other and looking toward the electronic device; (iii) confirming that the people are stationary, for a still image; and (iv) recording the image or video using the image capturing device. In one or more embodiments, controller 106 determines context by: (i) determining that the image capture mode is specific to capturing a performance by the subject; (ii) assessing scene imaged/presented in preview by image capturing device; (iii) confirming that the subject is initially inactive; (iv) detecting a transition by the subject to being active; and (v) recording the video using the image capturing device.

Figure 7:
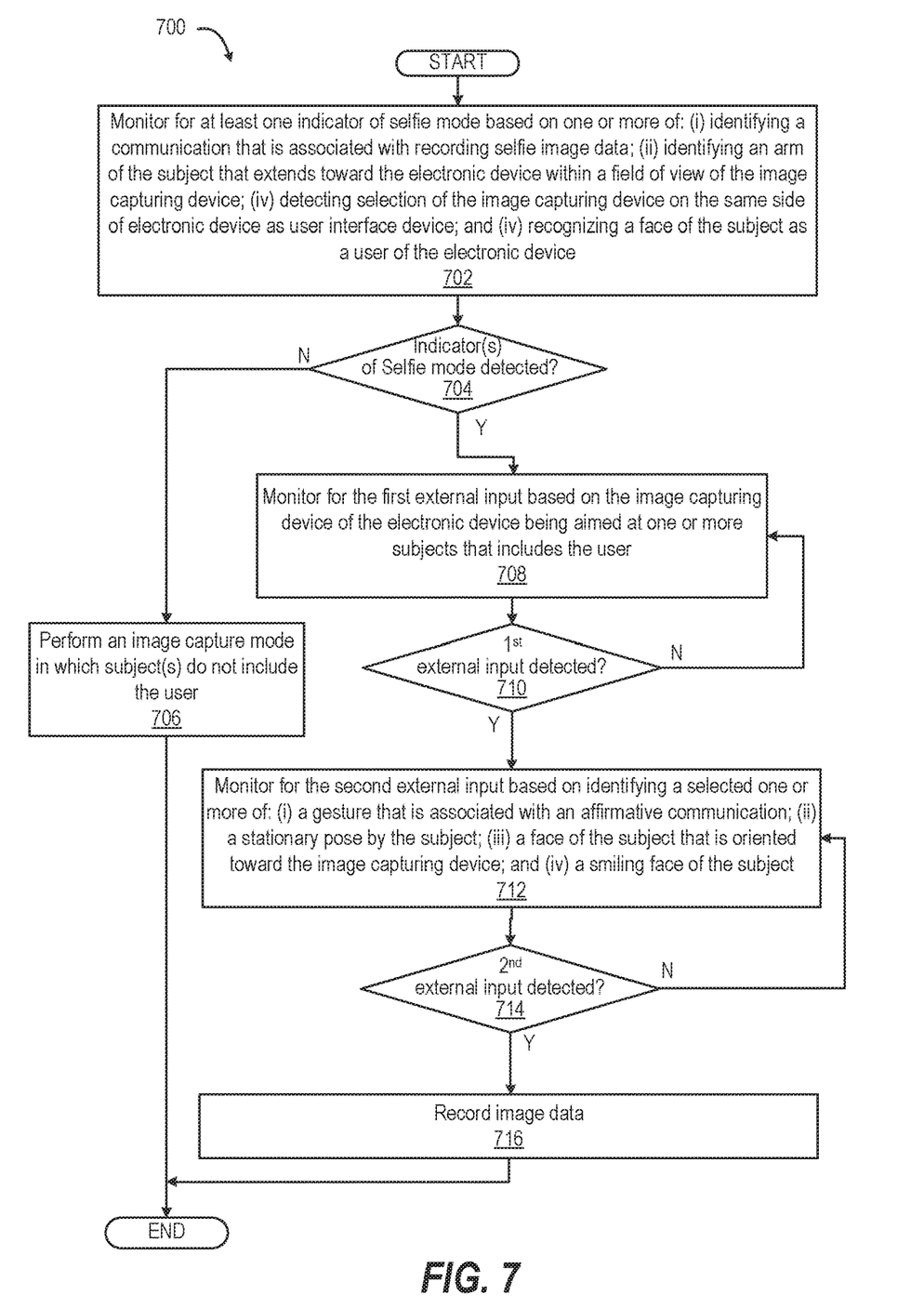
FIG. 7 is a flow diagram of a method for automatic recording of image data based, in part, on detection of a "selfie-mode" of use of the image capturing device, according to one or more embodiments.

FIG. 7 depicts method 700 for automatic recording of image data based, in part, on detection of image capturing device 102 (FIG. 1) being placed in a selfie-mode. In one or more embodiments, method 700 is performed entirely by, or under the supervision of, controller 106 (FIG. 1). In one or more embodiments, certain functions can be delegated to image controller 103 of image capturing device 102 (FIG. 1). At block 702, controller 106 (FIG. 1) monitors for at least one indicator of selfie mode based on one or more of: (i) identifying a communication that is associated with recording selfie image data; (ii) identifying an arm of the subject that extends toward the electronic device within a field of view of the image capturing device; (iii) detecting selection of the image capturing device on the same side of electronic device as user interface device; and (iv) recognizing a face of the subject as a user of the electronic device. A determination is made by controller 106 (FIG. 1), in decision block 704, whether at least one indicator of selfie mode is detected. In response to determining that at least one indicator of selfie mode is not detected, method 700 includes performing an image capture of subject(s) that does not include the user (block 706). Examples of normal modes of capturing of images are provided below in methods 800, 900 respectively in FIGS. 8, 9. Then method 700 ends.

In response to determining that at least one indicator of selfie mode is detected, method 700 includes monitoring for the first external input based on the image capturing device of the electronic device being aimed at one or more subjects that includes the user (block 708). A determination is made by controller 106 (FIG. 1), in decision block 710, whether the first external input is detected. In response to determining that the first external input is not detected, method 700 returns to block 708. In response to determining that the first external input is detected, method 700 includes monitoring for the second external input, which involves identifying a selected one or more of: (i) a gesture that is associated with an affirmative communication; (ii) a stationary pose by the subject for a still image capture; (iii) a face of the subject that is oriented toward the image capturing device; and (iv) a smiling face of the subject (block 712). The stationary pose can be determined based on capturing and comparing sequential transient copies of image data. Changes of the subject less than a threshold amount over a defined duration of time is deemed to be a good indication that the subject is in a stationary pose. A determination is made, in decision block 714, whether the second external input is detected. In response to not detecting the second external input, method 700 returns to block 712. In response to detecting the second external input, method 700 includes recording image data (block 716). Then method 700 ends.

Figure 8A:
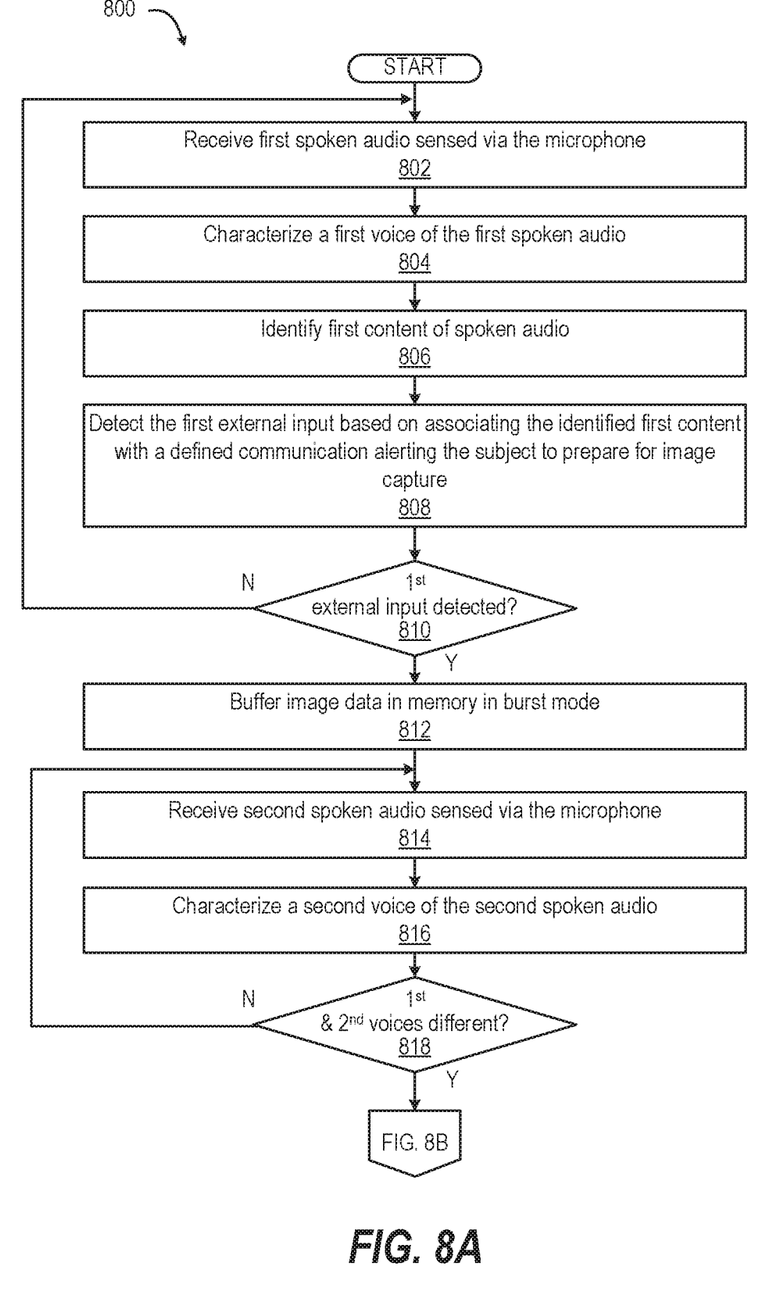
FIGS. 8A-8B are a flow diagram of a method for automatic recording of image data based on spoken context of interaction between a user and a subject, according to one or more embodiments.
Figure 8B:
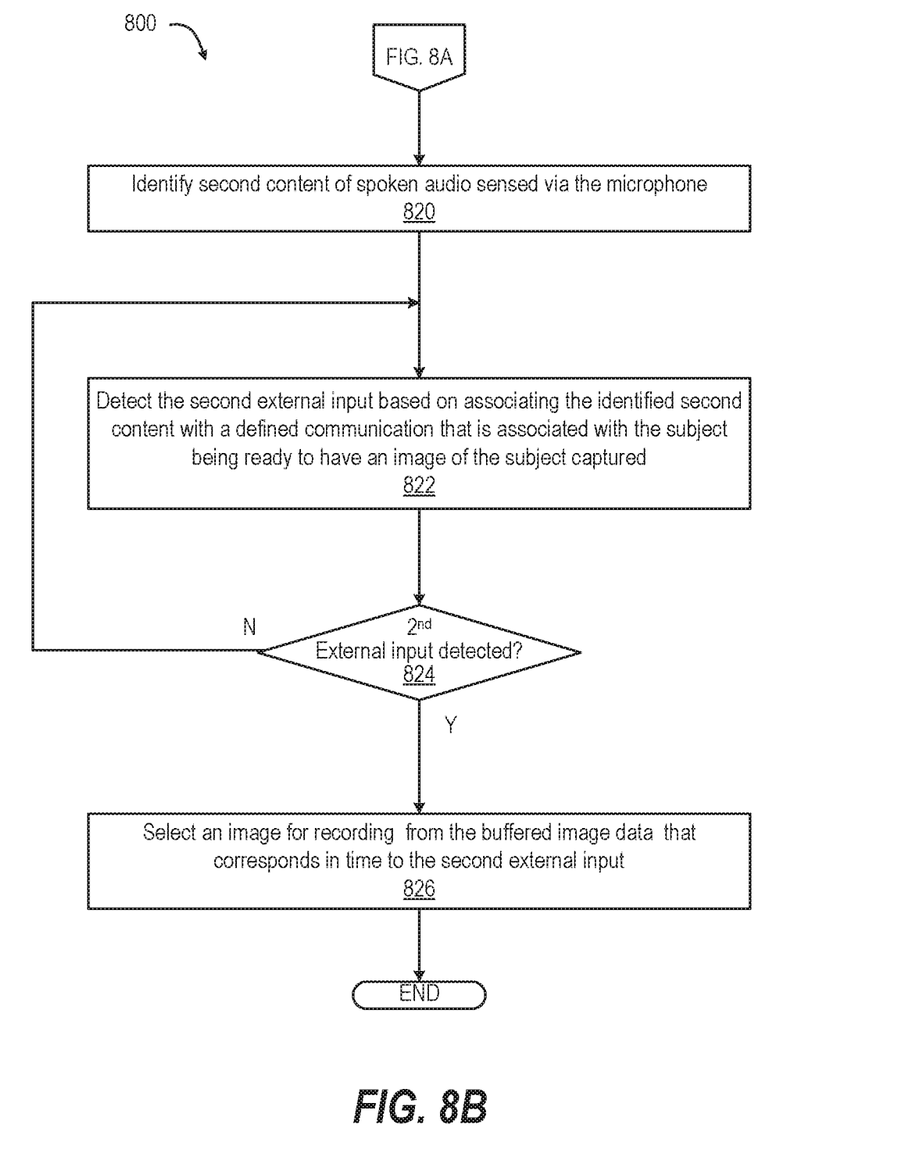

FIGS. 8A-8B depict example method 800 for automatic recording of image data based on spoken context of interaction between a user and a subject. In one or more embodiments, method 800 includes capturing burst mode images that are taken in rapid succession and closer in time than individual manually-triggered image recordings can be made. In one or more embodiments, method 800 is performed entirely by, or under the supervision of, controller 106 (FIG. 1). In one or more embodiments, certain functions can be delegated to image controller 103 of image capturing device 102 (FIG. 1). With initial reference to FIG. 8A, controller 106 (FIG. 1) receives first spoken audio that is sensed via the microphone (block 802). Method 800 includes controller 106 (FIG. 1) determining tonal and other characteristics of a first voice of the first spoken audio (block 804). The tonal characteristics are characterized to find identifying features that make the first voice different from other voices. The capability of identifying different voices enables detection of human communication between two different people. This capability can be used, for example, to ignore statements made by the user (first person 283 in FIG. 2) that would otherwise be incorrectly deemed to be a second external input by the subject (second person 284 in FIG. 2). Method 800 includes identifying first content of spoken audio sensed/detected via the microphone (block 806). Method 800 includes detecting the first external input based on associating the identified first content with a defined communication that alerts the subject to prepare for image capture (block 808). A determination is made, in decision block 810, whether the first external input is detected. In response to not detecting the first external input, method 800 returns to block 802. In response to detecting the first external input, method 800 includes buffering image data in memory in burst mode (block 812). Method 800 includes receiving second spoken audio that is sensed/detected via the microphone (block 814). Method 800 includes characterizing a second voice of the second spoken audio (block 816). The tonal characteristics are characterized to find identifying features that make the second voice different from other voices. A determination is made, in decision block 818, whether the first and second voices are different. In response to determining that the first and second voices are not different, method 800 returns to block 814.

With reference to FIG. 8B, in response to determining that the first and second voices are different, method 800 includes identifying second content of spoken audio sensed/detected via the microphone (block 820). Method 800 includes detecting the second external input based on associating the identified second content with a defined communication. The defined communication is associated with the subject being ready to have an image of the subject captured (block 822). A determination is made, in decision block 824, whether the second external input is detected. In response to not detecting the second external input, method 800 returns to block 822. In response to detecting the second external input, method 800 includes selecting for recording an image from the buffered image data that is captured at a time that corresponds in time to the second external input (block 826). Then method 800 ends.

Figure 9:
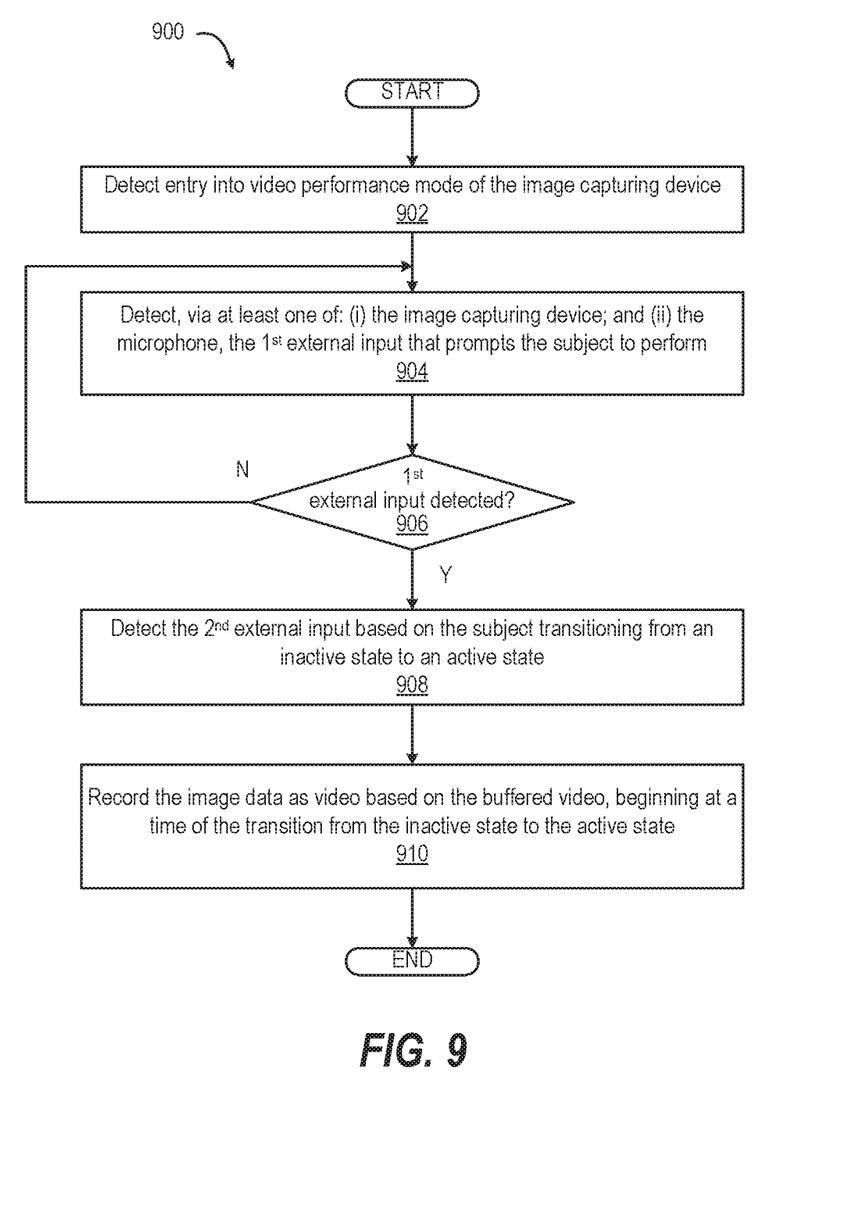
FIG. 9 is a flow diagram of a method for automatic recording of image data of a visual performance-based context of interaction between a user and a subject, according to one or more embodiments.

FIG. 9 depicts example method 900 for automatic recording of image data of a visual performance-based context of interaction between a user and a subject. Controller 106 (FIG. 1) detects entry into video performance mode of the image capturing device (block 902). In response to detecting entry into video performance mode, method 900 includes detecting, via at least one of (i) the image capturing device and (ii) the microphone, the first external input that prompts the subject to perform (block 904). A determination is made, in decision block 906, whether the first external input is detected. In response to not detecting the first external input, method 900 returns to block 904. In response to detecting the first external input, method 900 includes detecting the second external input based on the subject transitioning from an inactive state to an active state (block 908). In one or more embodiments, a determination of the transition from inactive to active is based on one or more characterizations such as: (i) not singing and singing; (ii) standing and running; (iii) not playing an instrument and playing an instrument; (iv) sitting and standing; (v) walking and running; and (vi) not speaking and speaking. In one or more embodiments, a determination of the transition from inactive to active is based on comparison to a threshold level of activity that is more than being wholly stationary. For example, an athlete may stretch or a singer may clear their throat before beginning to perform, yet the magnitude of the movement is less than an activity threshold. Method 900 includes recording the image data as video, based on the buffered video, beginning at a time of the transition from the inactive state to the active state (block 910). Then method 900 ends.

In each of the above flow charts presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
an image capturing device that can be triggered to sense and capture image data;
a microphone that senses audio;
a memory containing an image capture activation detection (ICAD) module; and
a controller communicatively coupled to the image capturing device, the microphone, and the memory, and that executes the ICAD module to enable the electronic device to:
in response to detecting entry of the image capturing device into an image capture mode, detect, via at least one of: (i) the image capturing device; and (ii) the microphone, a first external input that alerts a subject that an image of the subject is about to be captured by the image capturing device; and
in response to detecting the first external input:
start a timer;
monitor for detection by one of: (i) the image capturing device; and (ii) the microphone of a second external input by the subject that is associated with the subject being ready to have an image of the subject captured;
monitor for expiration of the timer;
restart the timer in response to detecting, prior to the timer expiring and before detecting the second external input, a third external input by the subject that corresponds to a request for more time to become ready;
in response to the timer expiring, discontinue detection of the second external input; and in response to detecting the second external input before expiration of the timer, activate recording of image data via the image capturing device.

2. The electronic device of claim 1, wherein the first external input is audio input detected via the microphone, and the controller enables the electronic device to:
  identify content of spoken audio sensed via the microphone; and
  associate the identified content with a communication alerting the subject to prepare for image capture.

3. The electronic device of claim 1, wherein the second external inputs is audio input detected via the microphone, and the controller enables the electronic device to:
  identify content of spoken audio sensed via the microphone; and
  associate the identified content with an indication that the subject is ready for image capture.

4. The electronic device of claim 1, wherein:
  the first external input is audio input detected via the microphone, the controller enables the electronic device to:
    identify content of spoken audio sensed via the microphone; and
    associate the identified content with a communication alerting the subject to prepare for image capture; and
  the second external inputs is audio input detected via the microphone, and the controller enables the electronic device to:
    identify content of spoken audio sensed via the microphone;
    associate the identified content with an indication that the subject is ready for image capture;
    distinguish a first voice of a first spoken audio from a second voice of a second spoken audio; and
    determine that the second external input is detected in response to distinguishing the first voice from the second voice.

5. The electronic device of claim 1, wherein the controller enables the electronic device to:
  in response to detecting the first external input:
    determine that a user is included within a field of view of the image capturing device; and
    in response to determining that the user is included within the field of view, detect as the second external input a preview image within a field of view of a lens of the image capturing device where at least one person within the field of view communicates the second external input.

6. The electronic device of claim 5, wherein, to determine that the user is included within a field of view of the image capturing device, the controller enables the electronic device to identify at least one of: (i) a communication that is associated with recording selfie image data; (ii) an arm of the subject that extends toward the electronic device within a field of view of the image capturing device; and (iii) a face of the subject as a user of the electronic device.

7. The electronic device of claim 1, wherein the controller enables the electronic device to:
  in response to detecting the first external input:
    recognize the subject within a field of view of the image capturing device;
    buffer, via the image capturing device, video that includes the subject;
    detect the second external input based on the subject transitioning from an inactive state to an active state; and
    record the image data by initiating capture of the buffered video beginning at a time of the transition from the inactive state to the active state.

8. The electronic device of claim 1, wherein, in response to the timer expiring, the controller enables the electronic device to perform a selected one of: (i) deactivate the image capturing device; and (ii) detect another first external input that alerts the subject that an image of the subject is about to be captured by the image capturing device.

9. The electronic device of claim 1, wherein the controller enables the electronic device to:
  in response to detecting the first external input:
    recognize the subject within a field of view of the image capturing device;
    buffer, via the image capturing device, two or more images that includes the subject; and
    record the image data from the buffered two or more images that corresponds to a selected image from the buffered two or more images in which the second external input is detected.

10. The electronic device of claim 1, wherein, to detect the second external input, the controller enables the electronic device to identify a selected one or more of: (i) a gesture that is associated with an affirmative communication; (ii) a stationary pose by the subject; (iii) a face of the subject that is oriented toward the image capturing device; and (iv) a smiling face of the subject.

11. A method comprising:
  in response to detecting entry of an image capturing device of an electronic device into an image capture mode, detecting, via at least one of: (i) the image capturing device; and (ii) the microphone, a first external input that alerts a subject that an image of the subject is about to be captured by the image capturing device; and
  in response to detecting the first external input:
    starting a timer;
    monitoring, by a controller of the electronic device, for detection by one of: (i) the image capturing device; and (ii) the microphone of a second external input by the subject that is associated with the subject being ready to have an image of the subject captured;
    monitoring for expiration of the timer;
    restarting the timer in response to detecting, prior to the timer expiring and before detecting the second external input, a third external input by the subject that corresponds to a request for more time to become ready;
    in response to the timer expiring, discontinuing detection of the second external input; and
    in response to detecting the second external input before expiration of the timer, activating, by the controller, recording of image data via the image capturing device.

12. The method of claim 11, wherein:
  detecting the first external input comprises: (i) identifying content of spoken audio sensed via the microphone; and (ii) associating the identified content with a communication alerting the subject to prepare for image capture; and
  detecting the second external input comprises: (i) identifying content of spoken audio sensed via the microphone; (ii) associating the identified content with an indication that the subject is ready for image capture; (iii) distinguishing a first voice of a first spoken audio from a second voice of a second spoken audio; and determining that the second external input is detected in response to distinguishing the first voice from the second voice.

13. The method of claim 11, further comprising:
in response to detecting the first external input:
determining that a user is included within a field of view of the image capturing device; and
in response to determining that the user is included within the field of view, detect as the second external input a preview image within a field of view of a lens of the image capturing device where at least one person within the field of view communicates the second external input.

14. The method of claim 13, wherein, to determine that the user is included within a field of view of the image capturing device, the controller enables the electronic device to identify at least one of: (i) a communication that is associated with recording selfie image data; (ii) an arm of the subject that extends toward the electronic device within a field of view of the image capturing device; and (iii) a face of the subject as a user of the electronic device.

15. The method of claim 11, further comprising:
in response to detecting the first external input:
recognizing the subject within a field of view of the image capturing device;
buffering, via the image capturing device, video that includes the subject;
detecting the second external input based on the subject transitioning from an inactive state to an active state; and
recording the image data by initiating capture of the buffered video beginning at a time of the transition from the inactive state to the active state.

16. The method of claim 11, further comprising:
in response to detecting the first external input:
recognizing the subject within a field of view of the image capturing device;
buffering, via the image capturing device, two or more images that includes the subject; and
recording the image data from the buffered two or more images that corresponds to a selected image from the buffered two or more images in which the second external input is detected.

17. The method of claim 11, wherein detecting the second external input comprises identifying a selected one or more of: (i) a gesture that is associated with an affirmative communication; (ii) a stationary pose by the subject; (iii) a face of the subject that is oriented toward the image capturing device; and (iv) a smiling face of the subject.

18. A computer program product comprising:
a non-transitory computer readable storage device; and
program code on the computer readable storage device that when executed by a processor associated with an electronic device having a controller, an image capturing device, and a microphone, the program code enables the electronic device to provide the functionality of:
in response to detecting entry of an image capturing device of an electronic device into an image capture mode, detecting, via at least one of: (i) the image capturing device; and (ii) the microphone, a first external input that alerts a subject that an image of the subject is about to be captured by the image capturing device; and
in response to detecting the first external input:
starting a timer;
monitoring, by a controller of the electronic device, for detection by one of: (i) the image capturing device; and (ii) the microphone of a second external input by the subject that is associated with the subject being ready to have an image of the subject captured;
monitoring for expiration of the timer;
restarting the timer in response to detecting, prior to the timer expiring and before detecting the second external input, a third external input by the subject that corresponds to a request for more time to become ready;
in response to the timer expiring, discontinuing detection of the second external input; and
in response to detecting the second external input before expiration of the timer, activating, by the controller, recording of image data via the image capturing device.

19. The computer program product of claim 18, the program code further enabling the electronic device to provide the functionality of:
in response to detecting the first external input:
recognize the subject within a field of view of the image capturing device;
buffer, via the image capturing device, at least one of two or more images and a video that includes the subject;
detect the second external input based on the subject transitioning from an inactive state to an active state; and
record the image data by initiating capture of the buffered video beginning at a time of the transition from the inactive state to the active state.

20. The computer program product of claim 18, the program code further enabling the electronic device to provide the functionality of detecting the second external input by identifying a selected one or more of: (i) a gesture that is associated with an affirmative communication; (ii) a stationary pose by the subject; (iii) a face of the subject that is oriented toward the image capturing device; and (iv) a smiling face of the subject.

* * * * *